(12) United States Patent
Eyrainer et al.

(10) Patent No.: US 6,431,586 B1
(45) Date of Patent: Aug. 13, 2002

(54) VEHICLE OCCUPANT RESTRAINT DEVICE

(75) Inventors: Heinz Eyrainer, Waldstetten; Alexander Heilig, Wissgoldingen; Reiner Dannenhauer, Welzheim, all of (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/665,699

(22) Filed: Sep. 20, 2000

(30) Foreign Application Priority Data

Sep. 20, 1999 (DE) .................................. 299 16 526 U
Apr. 26, 2000 (DE) ........................................ 100 20 353

(51) Int. Cl.⁷ ............................................. B60R 21/16
(52) U.S. Cl. ..................................... 280/730.1; 280/732
(58) Field of Search ..................... 280/730.1, 731, 280/732, 743.2, 729, 739, 749

(56) References Cited

U.S. PATENT DOCUMENTS

| | | | |
|---|---|---|---|
| 2,755,125 A | | 7/1956 | Hodges |
| 2,806,737 A | | 9/1957 | Maxwell |
| 2,834,606 A | | 5/1958 | Bertrand |
| 3,642,303 A | * | 2/1972 | Irish et al. ................ 280/730.1 |
| 3,664,682 A | * | 5/1972 | Wycech .................... 280/730.1 |
| 3,897,961 A | * | 8/1975 | Leising et al. ........... 280/730.1 |
| 4,169,613 A | * | 10/1979 | Barnett ........................ 280/732 |
| 5,470,103 A | * | 11/1995 | Vaillancourt et al. .... 280/730.1 |
| 5,602,734 A | * | 2/1997 | Kithil ........................... 701/45 |
| 6,036,222 A | * | 3/2000 | Holmes et al. .......... 280/728.2 |
| 6,106,000 A | * | 8/2000 | Stewart .................... 280/728.2 |
| 6,113,132 A | * | 9/2000 | Saslecov .................. 280/730.1 |
| 6,224,088 B1 | * | 5/2001 | Lohavanijaya ........... 280/728.2 |

FOREIGN PATENT DOCUMENTS

| | | |
|---|---|---|
| DE | 1555142 | 7/1970 |
| DE | 4304152 | 8/1993 |

* cited by examiner

Primary Examiner—J. J. Swann
Assistant Examiner—David R. Dunn
(74) Attorney, Agent, or Firm—Tarolli, Sundheim, Covell, Tummino & Szabo L.L.P.

(57) ABSTRACT

A restraint device for an occupant in a vehicle having a steering wheel, a dashboard with a lower end limiting a footwell, an A-pillar and a windshield, comprises a first gas bag for protecting the thorax area of a vehicle occupant, and a second gas bag for supporting the first gas bag. The second gas bag has a deployed condition and extends at least partly over the windshield of the vehicle in the deployed condition.

2 Claims, 9 Drawing Sheets

VEHICLE OCCUPANT RESTRAINT DEVICE

TECHNICAL FIELD

This invention relates to a restraint device for an occupant in a vehicle having a steering wheel, a dashboard with a lower end limiting a footwell, an A-pillar and a windshield.

BACKGROUND OF THE INVENTION

In certain accident situations, known vehicle occupant restraint devices comprising a gas bag for protecting the thorax area of a vehicle occupant often provide only an insufficient protection against injuries of the cervical spine.

BRIEF SUMMARY OF THE INVENTION

By means of the invention a vehicle occupant restraint device is provided, which can flexibly adapt to the respective accident situation, and by means of which the risk of injury of a vehicle occupant can be kept extremely small. The restraint device according to the invention for an occupant in a vehicle having a steering wheel, a dashboard with a lower end limiting a footwell, an A-pillar and a windshield, comprises a first gas bag for protecting the thorax area of a vehicle occupant, and a second gas bag for supporting the first gas bag. The second gas bag has a deployed condition and extends at least partly over the windshield of the vehicle in the deployed condition.

If required in the case of a vehicle collision, the additional second gas bag serves as a support for the first gas bag and maintains the same in a predetermined position during the course of the accident, so that an optimum protective function of the first gas bag is ensured. The ensured defined position of the first gas bag and the perhaps possible division of the impact energy of the vehicle occupant over two separate gas bags allows to reduce the volume of the first gas bag from about 100 to 150 liters of commonly used thorax gas bags to about 70 to 90 liters without impairing the protective effect. Due to the reduction of the required gas quantity, less expensive gas generators can thus be used for inflating the gas bag. In addition, the use of a gas bag of reduced volume provides for a reduction of the inflation time as compared to conventional thorax gas bags, and the occupant has a reduced risk of injury during the process of deployment.

The second gas bag in addition prevents a contact of the head of the occupant with the windshield, where the arrangement of the two gas bags creates a specific freedom of movement for the head of the vehicle occupant, so that the acceleration moments acting on the neck are minimized during an accident. This provides for a significant reduction of the load acting on the cervical spine.

Preferably, the second gas bag is arranged such that in the deployed condition it is supported on the windshield. This ensures an optimum protective effect for the vehicle occupant, as with such a constellation the first gas bag is indirectly supported on the windshield via the second gas bag, and thus the impact of the vehicle occupant can optimally be absorbed. To furthermore avoid head injuries due to a possible contact of the head of the vehicle occupant with the A-pillar of the vehicle in the case of an inclined or offset impact, the second gas bag preferably extends over at least a portion of the A-pillar in the deployed condition.

From a functional and constructional point of view it has turned out particularly advantageous to accommodate the second gas bag in the roof liner of the vehicle. In this preferred embodiment, the second gas bag is deployed from the top to the bottom along the windshield, which involves no hazard potential for the occupant during the deployment of the gas bag, especially when the occupant is out of position, so to speak, has no normal seating position. This is often the case with children on the front seats. In particular in the case of convertible cars, which do not have a solid roof, the second gas bag can, however, also be accommodated in the dashboard or in the region of the A-pillar of the vehicle.

In the case of vehicles having both a driver-side and a passenger-side restraint means with one gas bag each for protecting the thorax area, the second gas bag advantageously extends substantially over the entire width of the windshield. In the case of a collision it can then serve as a support both for the driver-side and for the passenger-side thorax gas bag. However, there may also be provided two separate systems with one inventive vehicle occupant restraint device each.

In a further embodiment of the inventive device a traction system is provided, which after a vehicle collision pulls the deployed second gas bag away from the windshield, in order to again clear the field of vision for the driver and/or the passenger.

The first gas bag for protecting the thorax area of the vehicle occupant may be accommodated in the steering wheel in the case of a device for the driver of a motor vehicle, or in the dashboard of the vehicle in the case of a device for the passenger. An additional protective function is obtained in the latter case by accommodating the first gas bag in the lower portion of the dashboard limiting the footwell. The gas bag extending from the footwell over the dashboard in the deployed condition then also performs the function of a knee protection device.

An additional protection of the knee area of the vehicle occupant can also be achieved in that a third gas bag is provided, which is deployed in the footwell of the vehicle. A particularly space-saving embodiment is one where a gas generator is provided for inflating more than one of the gas bags.

An even better adaptation to the respective accident situation and also to the parameters of the vehicle occupant is obtained in that a multi-stage gas generator is used for inflating at least the first gas bag. Depending on the intensity of the vehicle collision and the weight of the vehicle occupant, the first gas bag can for instance be inflated harder or less hard. This also provides for a controlled time delay during inflation.

DETAILED DESCRIPTION OF PREFERRED EMBODIMENTS

Figure 1:
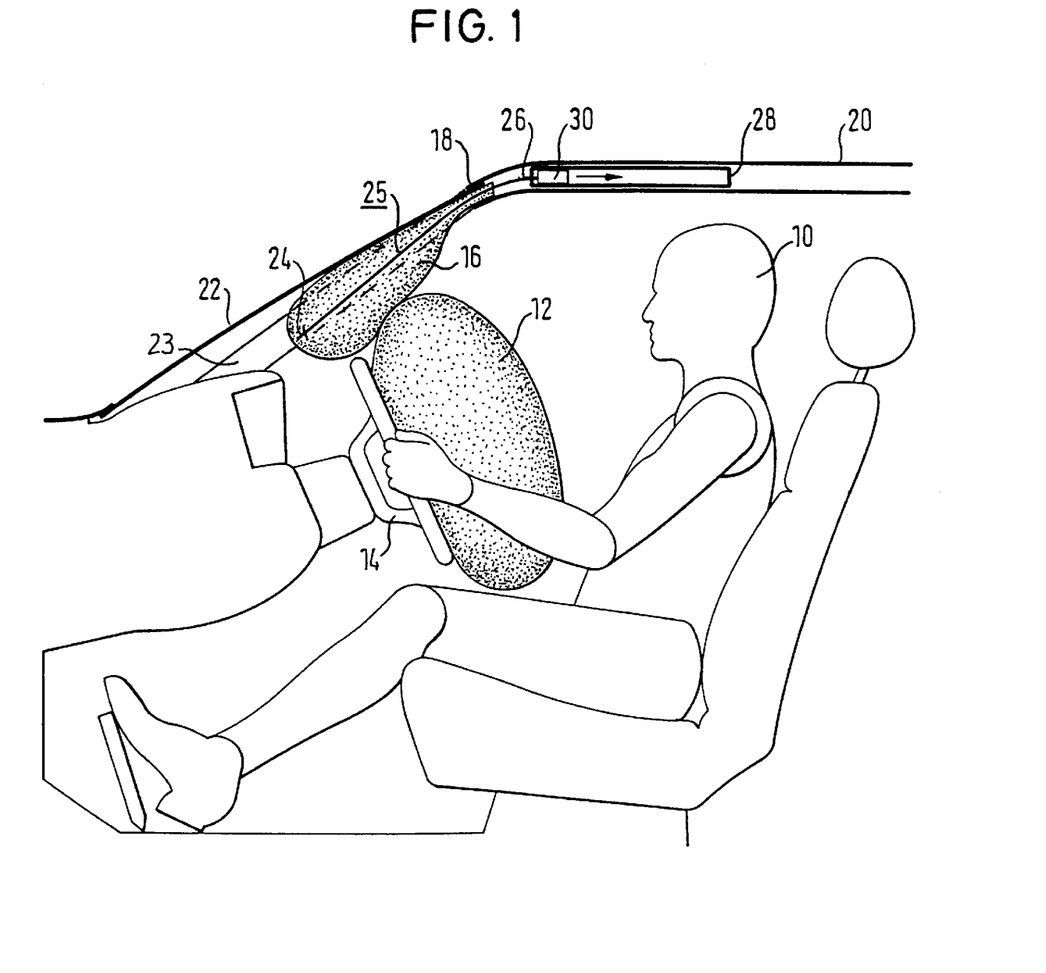
FIG. 1 shows an embodiment of a driver-side vehicle occupant restraint device in a motor vehicle.

FIG. 1 represents a vehicle occupant restraint device for the driver of a motor vehicle in the activated condition. A first gas bag 12 for protecting the thorax area of the vehicle occupant 10 has deployed out of the steering wheel 14. A second gas bag 16, which has deployed from the top to the bottom before the first gas bag 12 from a fixture 18 in the roof liner 20 above the windshield 22, extends over the upper portion of the windshield 22 of the vehicle. The second gas bag 16, which directly rests against the windshield 22, indirectly supports the first gas bag 12 at the windshield 22, so that the same is held in its predetermined position. Furthermore, the second gas bag 16 preferably covers almost the entire A-pillar 23 of the vehicle towards the occupant. At the outer surface of the second gas bag 16 a first end 24 of a strap 25 is fixed. The second end 26 of the strap is coupled to the piston 30 of a piston/cylinder unit 28 disposed in the roof liner 20 of the vehicle. By activating this piston/cylinder unit 28 after the vehicle collision, for instance by applying a compressed gas onto the side of the piston 30 facing the windshield, the piston 30 moves away from the windshield 22 and thereby pulls the deployed second gas bag 16 away from the windshield 22, so that the forward visibility through the windshield 22 is clear again. Strap 25 and piston/cylinder unit 28 constitute a traction system.

Figure 2:
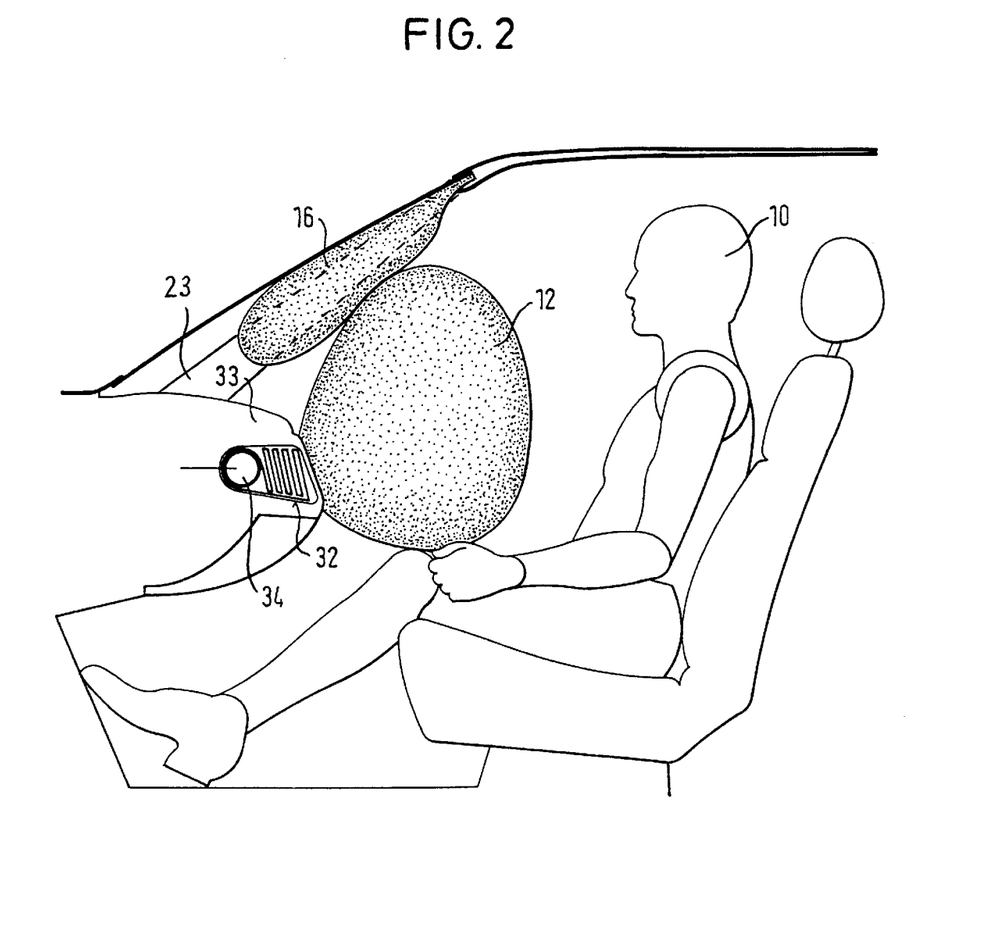
FIG. 2 shows an embodiment of a passenger-side vehicle occupant restraint device in a motor vehicle.

FIG. 2 shows a restraint device for the passenger of a motor vehicle, which largely corresponds to the device represented in FIG. 1, but without restraint system 24, 28 for the second gas bag 16. In contrast to the device shown in FIG. 1, the first gas bag 12 for protecting the thorax area has deployed from a fixture 32 of the dashboard 33 facing the chest of the vehicle occupant 10. In the fixture 32 of the dashboard 33 there is also indicated a multi-stage gas generator 34, by means of which the first gas bag 12 is inflated corresponding to the respective requirements. The second gas bag 16 however, can also be arranged under the cladding of the A-pillar 23.

Figure 3:
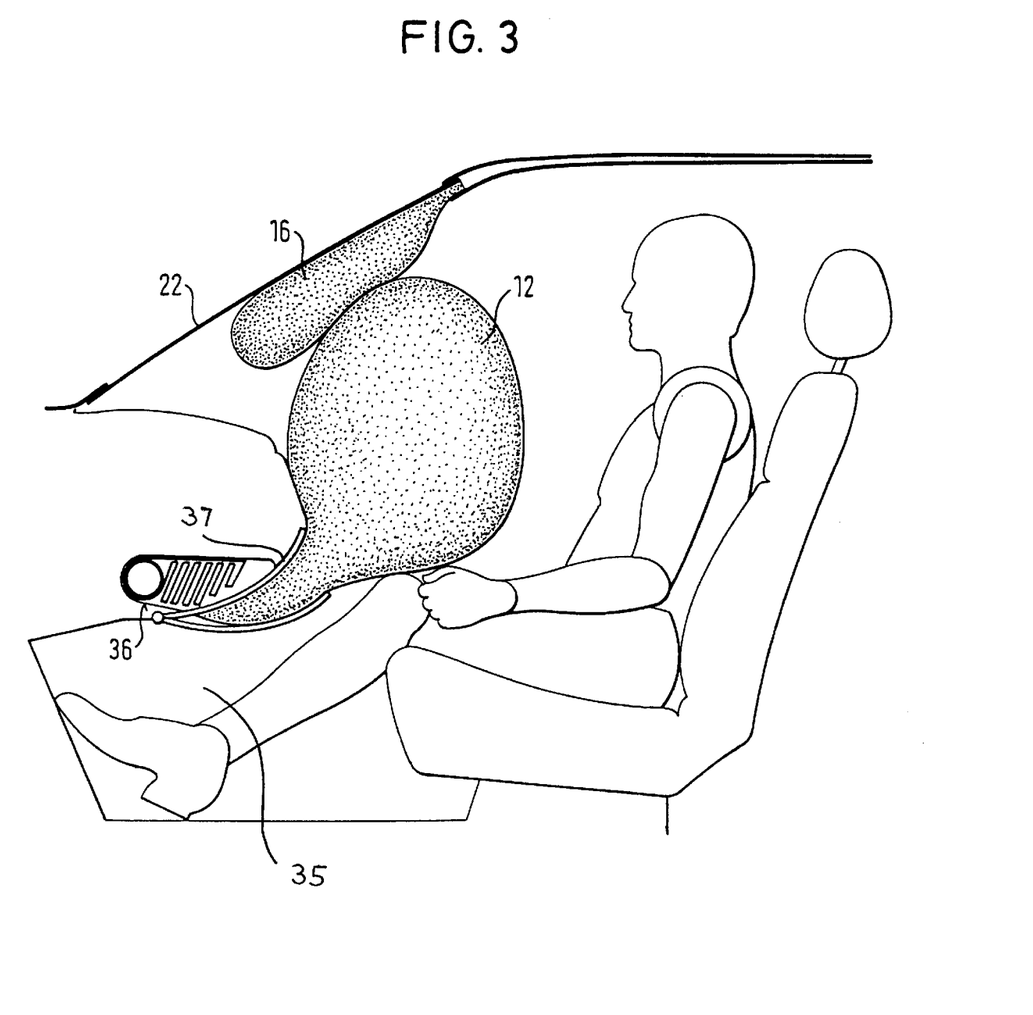
FIG. 3 shows a variant of the embodiment of FIG. 2.

The vehicle occupant restraint device represented in FIG. 3 differs from the one shown in FIG. 2 in that the first gas bag 12 was accommodated in a fixture 36 disposed in the lower portion 37 of the dashboard 33 limiting the footwell 35 and has deployed from the footwell over the dashboard 33 up to the second gas bag 16, which in turn supports the first gas bag 12 at the windshield 22. In this embodiment, the first gas bag 12 in addition performs the function of a knee protection means, which otherwise requires for instance the provision of a separate, so-called kneebag.

Figure 4:
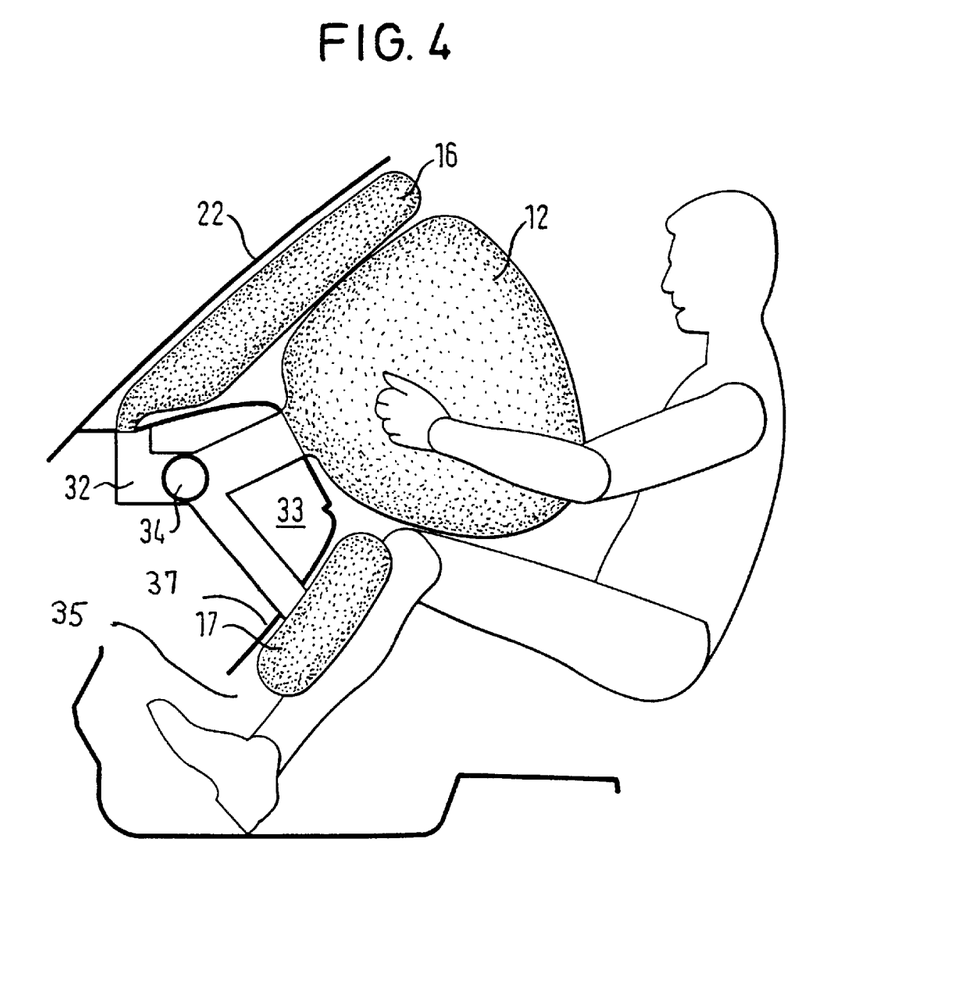
FIG. 4 shows a further embodiment of a passenger-side vehicle occupant restraint device in a motor vehicle.

In the embodiment of FIG. 4 a third gas bag 17 for protecting the knee area of the vehicle occupant is provided in addition to the first passenger-side gas bag 12 and the second gas bag 16 on which the first gas bag 12 is supported. The third gas bag is deployed in the footwell 35 of the vehicle and is supported on a portion 37 of the dashboard 33 limiting the footwell 35. In accordance with the represented embodiment, the second gas bag 16 has deployed from the bottom to the top out of an opening of the dashboard 33 facing the windshield 22 (preferably out of the openings of the air distribution duct), in contrast to the embodiments described so far. In this embodiment, the gas bag 16 is arranged in a region of the dashboard close to the windshield 22. In the illustrated embodiment, all three gas bags 12, 16, 17 are inflated by a single gas generator 34 of a gas bag module which is accommodated in a fixture 32 of the dashboard 33. There may, however, also be provided two or three different gas generators.

Figure 5:
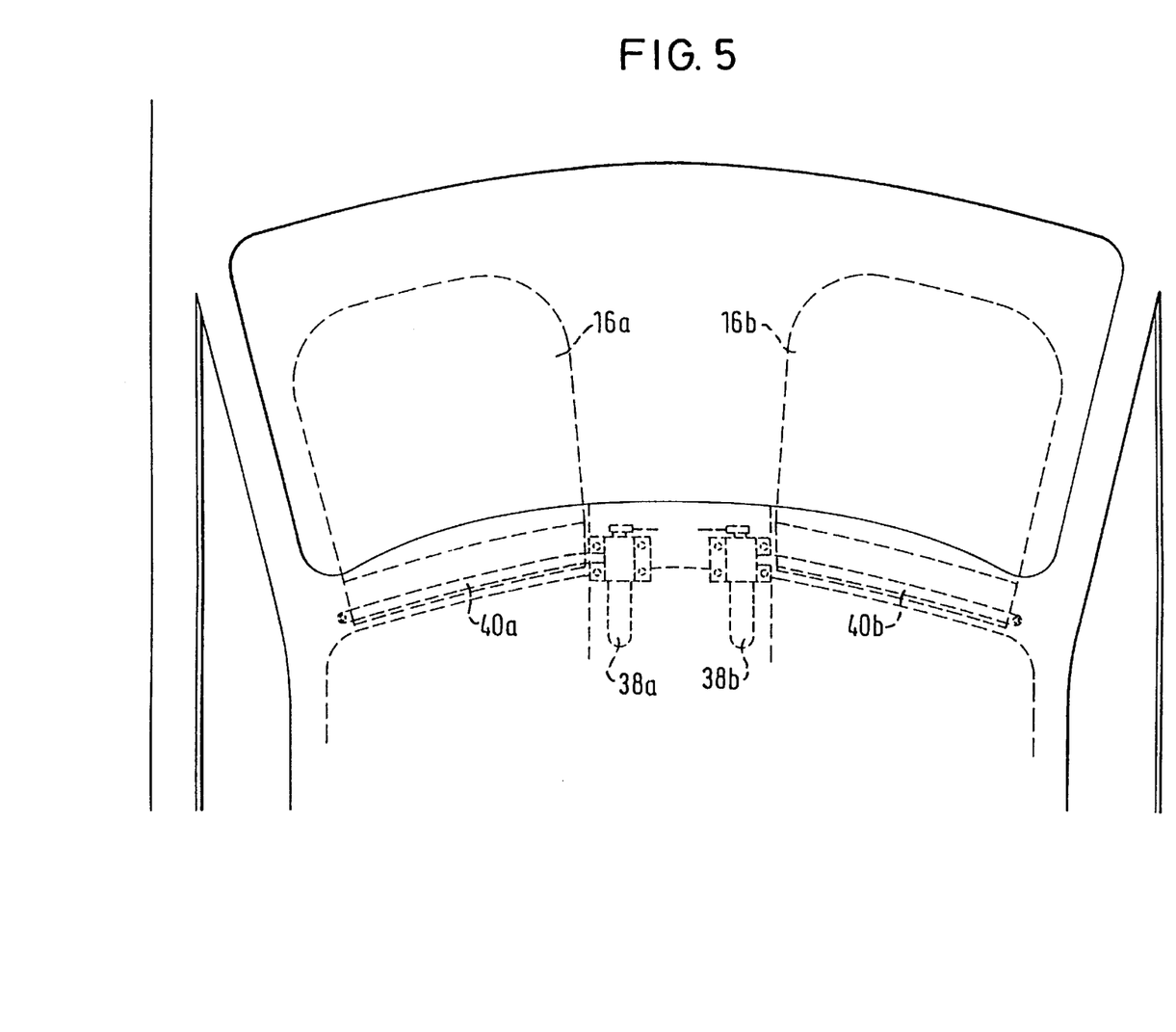
FIG. 5 shows embodiments of the part of a driver-side and a passenger-side vehicle occupant restraint device having the second gas bag with separate gas supply systems in a motor vehicle in a top view.
Figure 6:
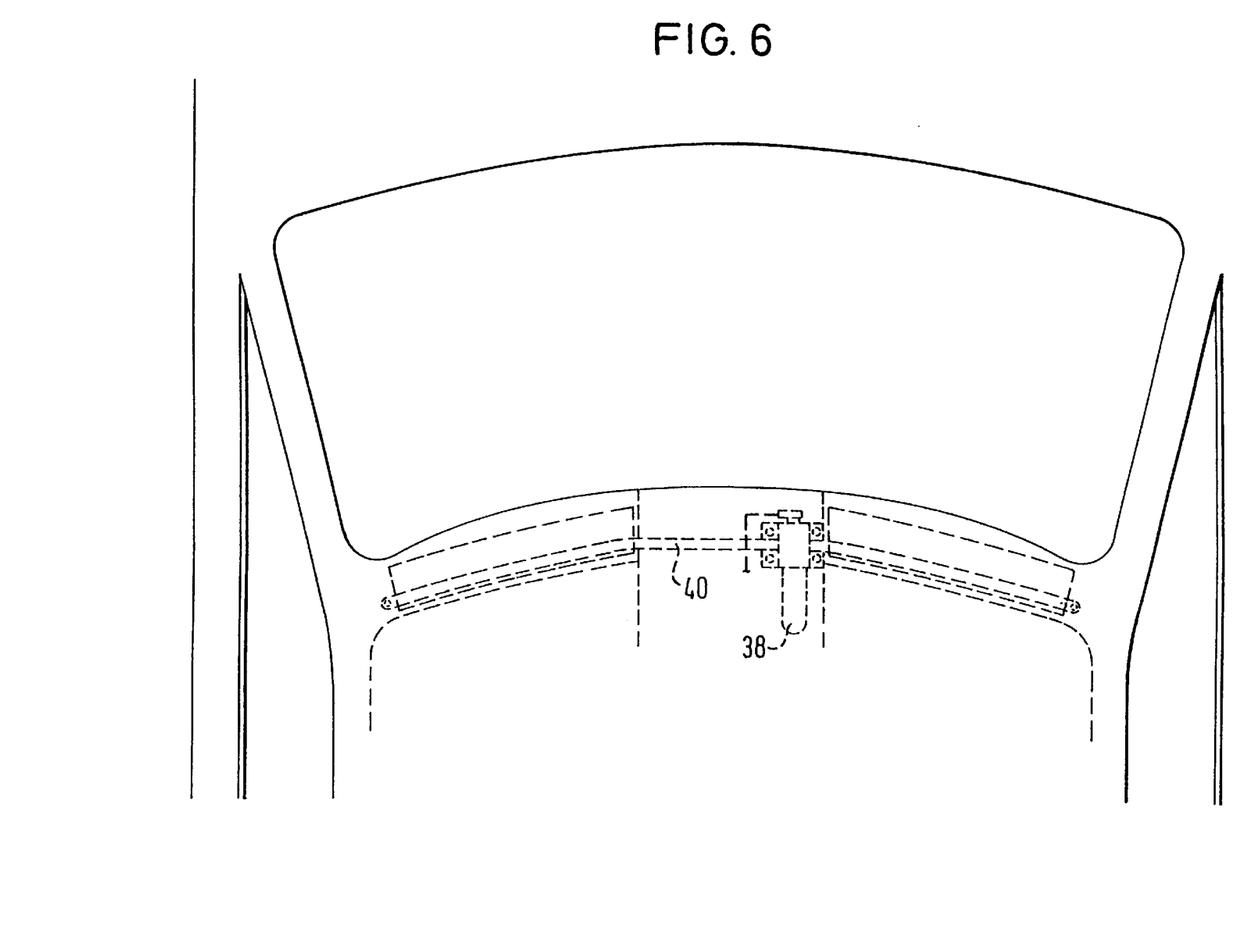
FIG. 6 shows embodiments of the part of a driver-side and a passenger-side vehicle occupant restraint device having the second gas bag with a common gas supply system in a motor vehicle in a top view.

FIG. 5 represents an embodiment of the invention which provides a separate second gas bag each on the driver side and on the passenger side. In a top view of the vehicle the driver-side second gas bag 16a and the passenger-side second gas bag 16b are shown in the inflated condition. In this embodiment there is also provided a separate gas supply system including gas generators 38a, 38b and gas tubes 40a, 40b for each of the driver-side and the passenger-side second gas bags 16a, 16b, which gas generators and gas tubes are accommodated in the roof liner of the vehicle. As in the embodiment shown in FIG. 6, the driver-side and the passenger-side gas bags may be supplied from a common gas supply system including a single gas generator 38 and a gas tube 40, which extends in or through both gas bags.

Figure 7:
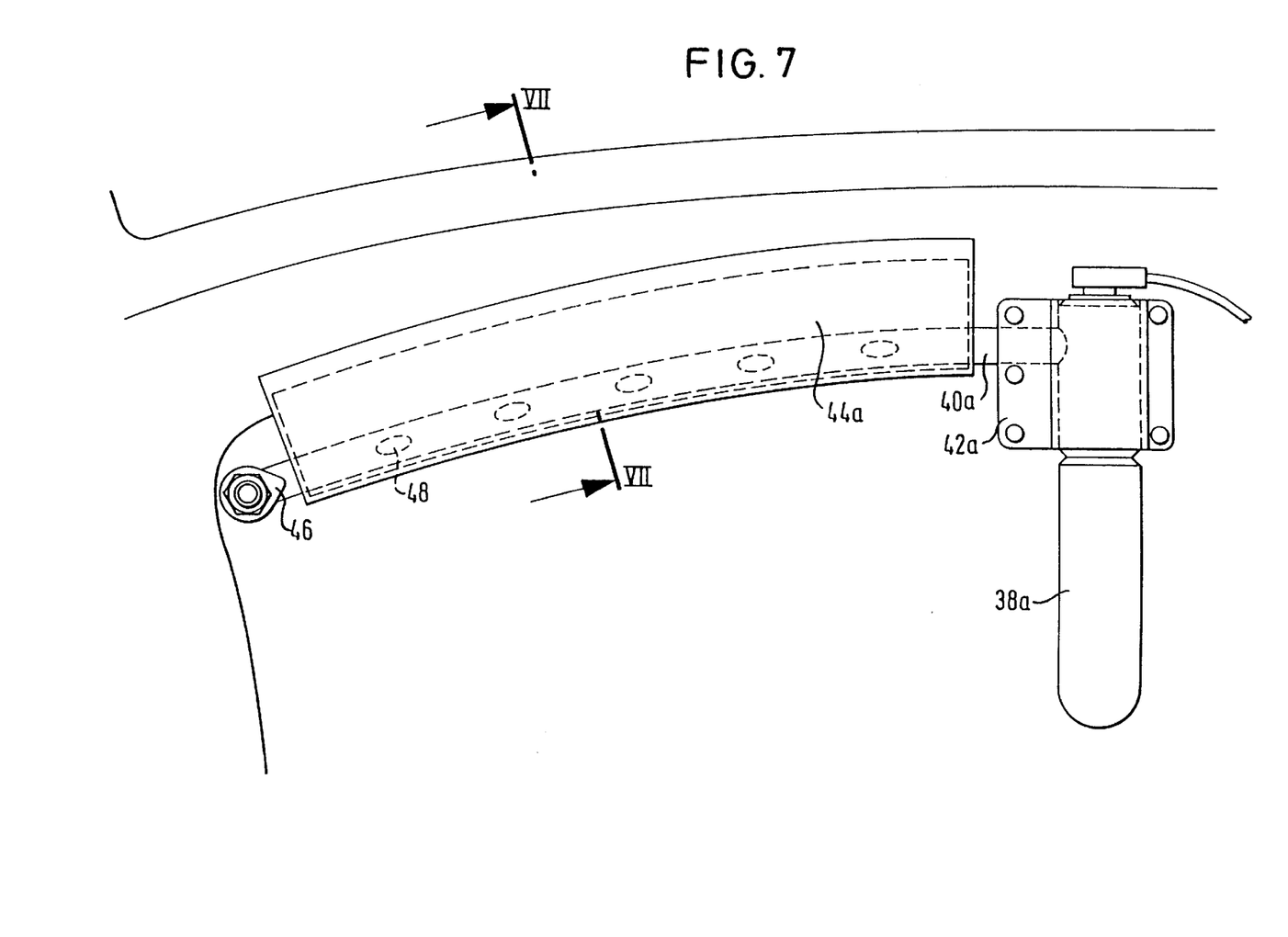
FIG. 7 shows a part of the driver-side vehicle occupant restraint device of FIG. 4 in an enlarged view.

The passenger-side gas bag module of the embodiment having the separate gas supply systems in accordance with FIG. 5 is represented in FIG. 7 in an enlarged view. The gas generator 38a is fixed at the vehicle roof by means of the housing 42a. The gas tube 40a extends from the gas generator 38a through the gas bag housing 44a and the gas bag folded up therein, which can be better seen in the section shown in FIG. 8. At its other end, the gas tube is fixed at the vehicle by means of a holder 46. The portion of the gas tube 40a disposed in the interior of the gas bag has escape openings 48.

Figure 8:
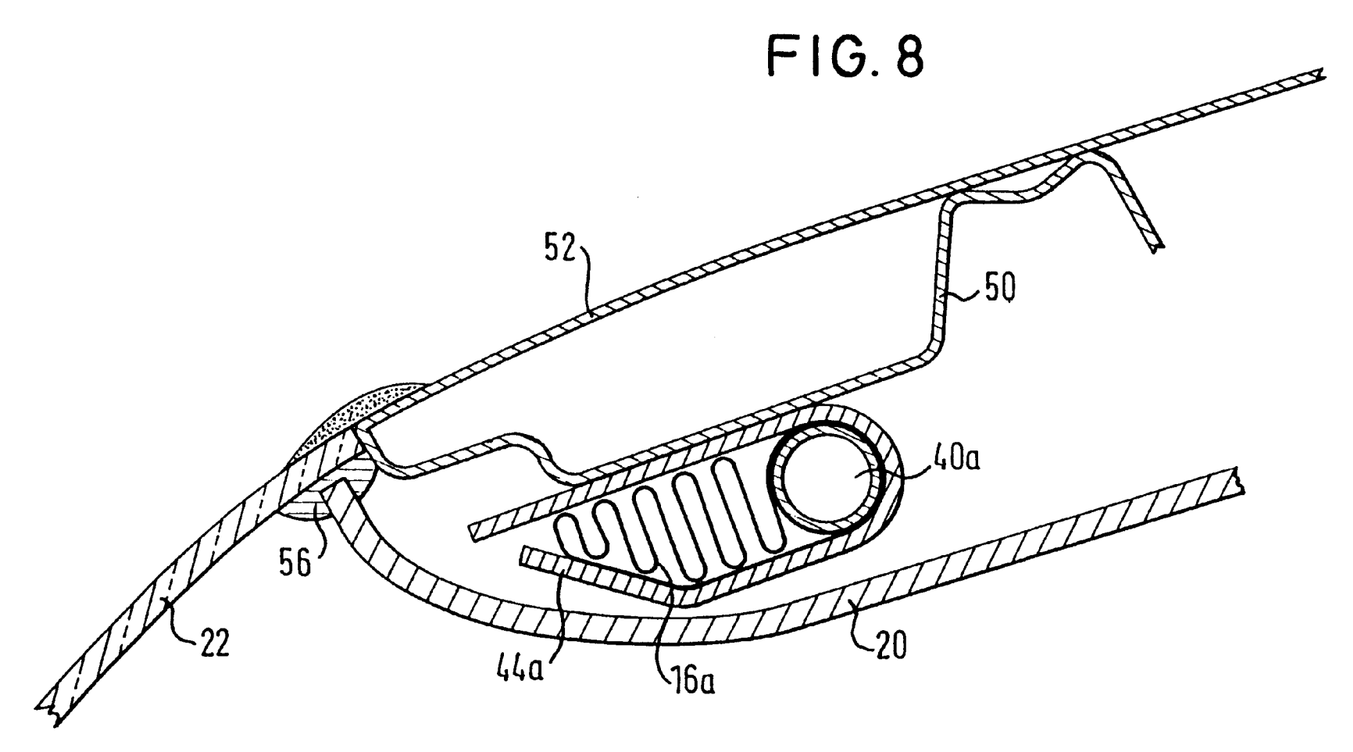
FIG. 8 shows a section through the part of the vehicle occupant restraint device along line VII—VII of FIG. 7 in the non-inflated condition of the second gas bag.
Figure 9:
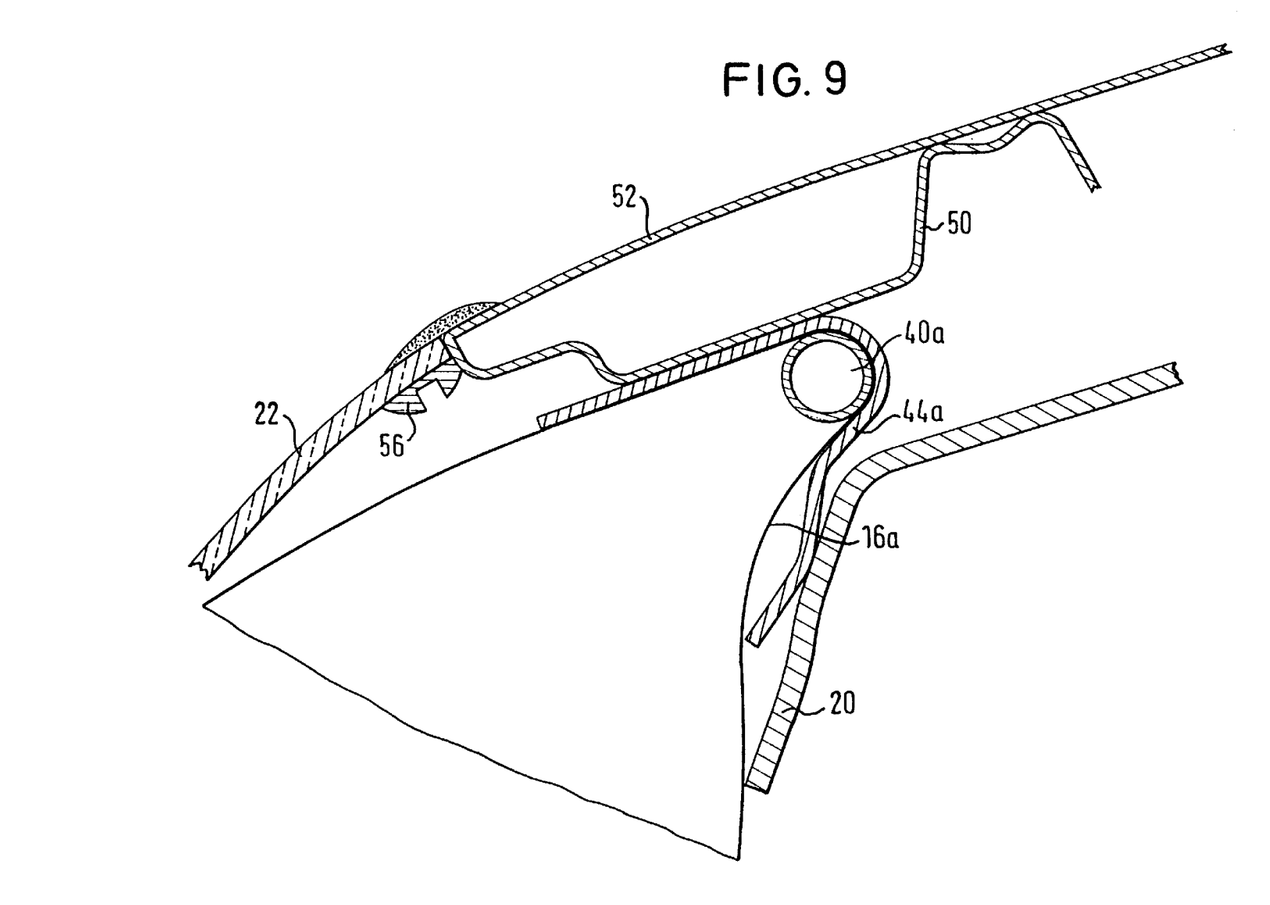
FIG. 9 shows the vehicle occupant restraint device of FIG. 8 in the inflated condition.

FIG. 8 illustrates that the gas bag housing 44a is mounted at a reinforcing sheet of metal 50 of the vehicle roof 52 below the roof liner 20. Upon activation (FIG. 9), the gas bag housing 44a is pressed open by the deploying gas bag. In addition, the gas bag 16 forces the roof liner 20 out of its holder 56 at the windshield 22, so that the gas bag 16a can spread in the direction of the windshield 22.

In all embodiments it is provided that the second gas bag 16, 16a, 16b is only deployed when this is required by the accident situation or by corresponding other circumstances, e.g. the parameters of the vehicle occupant 10.

When using the inventive vehicle occupant restraint device including a two-stage gas generator 34 in cooperation with belt usage, seat occupation and speed sensors a number of matching combinations is possible which is increased by the factor of 2.

What is claimed is:

1. A restraint device for an occupant in a vehicle having a windshield, said device comprising:
    a first inflatable gas bag for, when inflated, protecting the thorax area of a vehicle occupant,
    a second inflatable gas bag for supporting said first gas bag when said first and second gas bags are inflated,
    said second gas bag, when inflated, extending at least partly over said windshield of the vehicle, and
    a traction system for pulling said inflated second gas bag away from said windshield after a vehicle collision to clear a forward visibility through said windshield.

2. A restraint device for an occupant in a vehicle having a steering wheel, a dashboard, an A-pillar and a windshield extending in a first direction obliquely upwardly from said dashboard, and a footwell defined by a lower end of said dashboard and a vehicle floor, said device comprising:
    a first inflatable gas bag for, when inflated, protecting the thorax area of a vehicle occupant, and a second inflatable gas bag, separate from said first gas bag, and inflating through an opening different from an opening through which said first gas bag inflates, said second gas bag having a front wall and a rear wall opposite said front wall, said second gas bag inflating in an elongated shape in a side view and extending over more than a half of the height of said windshield of the vehicle and parallel to said windshield with said front wall facing and contacting said windshield, said second gas bag, when inflated, being supported at said windshield, said second gas bag, when inflated, having a first dimension extending in said first direction, said first dimension being greater than a second dimension of said second gas bag extending in a second direction perpendicular to said first direction and perpendicular to an outer surface of said windshield, said first gas bag, when inflated, resting against said rear wall of said second gas bag and being supported and maintained in position by a portion of said front wall of said second gas bag resting on said windshield, said portion of said front wall lying opposite to said portion of said rear wall contacting said first gas bag, and a traction system for pulling away said second gas bag when said second gas bag has been inflated, from said windshield after a vehicle collision.

* * * * *